March 20, 1934.   H. D. HOOGE   1,951,611
ORDER INDICATING DEVICE
Filed March 18, 1933
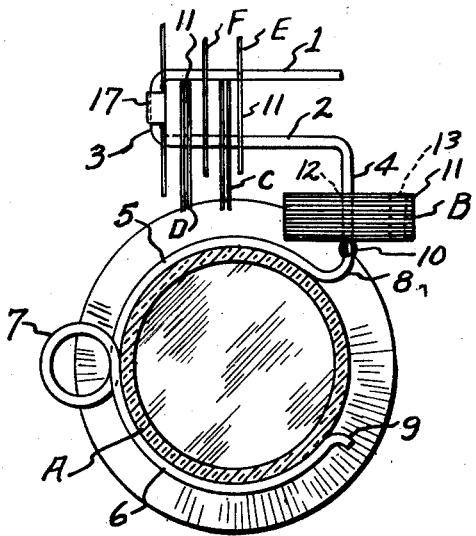
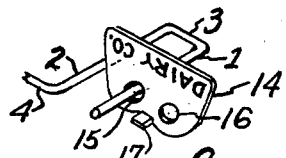
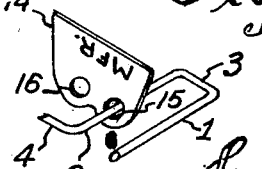
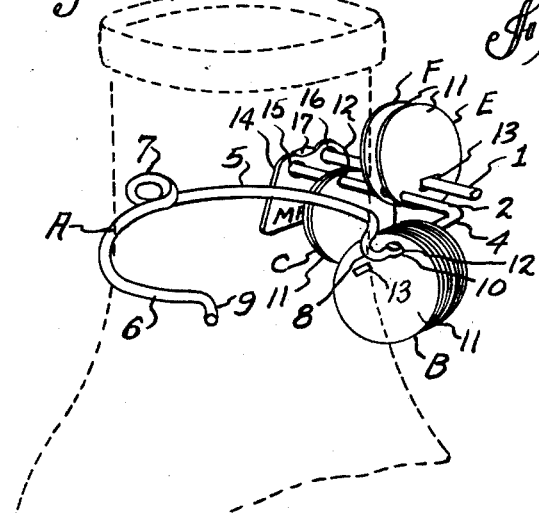
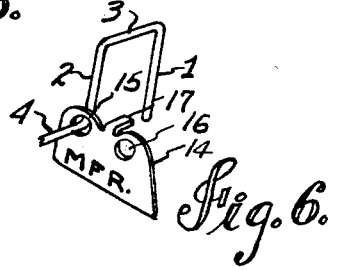
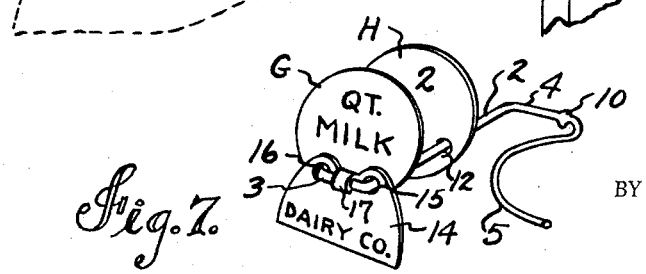
INVENTOR.
Harry D Hooge
BY
ATTORNEYS.

Patented Mar. 20, 1934

1,951,611

UNITED STATES PATENT OFFICE 1,951,611

ORDER INDICATING DEVICE

Harry D. Hooge, Cincinnati, Ohio

Application March 18, 1933, Serial No. 661,602

20 Claims. (Cl. 40—19.5)

My invention relates to display, signal or indicating devices, and more particularly to devices for indicating what items are to be delivered by a merchant or distributor to a customer, as for instance by a dairy product distributor delivering products at the entrances of homes, who takes away one or more empty containers when delivering the products.

An object of my invention is to provide a simple and inexpensive device of such character, which will be easily stored, handled and manipulated by the customer who indicates the order for the products, and easily read by the person making the delivery. A further object is to provide such a device in a form in which it is durable, and which is easily kept in serviceable and sanitary condition. Further objects will appear in the course of the following description.

Broadly, my invention includes a portable rack and order indicating means comprising one or more elements so mounted on the rack as to be readily moved into or out of an indicating position thereon. In its preferred form the rack has a pivot part and a display part, and the order indicating means consists of a series of elements each in the form of a metal check with openings, and receiving the pivot part of the rack through one opening, so as to hang on said part, out of indicating position; the display part of the rack having two members, one disposed to be received through the one opening of the element when the latter is slid off the pivot part, so that the element may hang on this member, out of indicating position; and the display part having its other member disposed to be received in the other opening of the element, so that the element may be held in a definite order indicating position. Each element thus may bear an indication of a respective different product, and the amount thereof, or certain elements may indicate amount and be used in conjunction with elements indicating the product. One or more elements may thus be brought into position to indicate an order for any article or number of articles or combination of articles which the customer may wish the deliveryman to leave when taking the empty container.

Also, preferably, my invention includes a bottle embracing extension whereby it may be conveniently detachably mounted on a bottle which is left to be taken by the deliveryman, who transfers it to a bottle which he leaves; and also a hanger portion by which the device may be hung up when not on a bottle. Preferably a display element is fixed on the rack for displaying the name or advertisement of the dealer, who preferably supplies his customers with the device free of charge. This display element also acts as a stop for the indicating elements.

In the drawing:

Figure 1 is a plan view of the preferred device, on a bottle shown in cross section at the plane of contact of the device.

Figure 2 is a rear perspective view of the device on the bottle, the latter being indicated by dotted lines.

Figure 3 shows one of the indicating elements.

Figs. 4, 5 and 6 illustrate stages of assembly.

Fig. 7 is a partial front perspective view of the device.

Figs. 8 and 9 are partial perspective views showing modifications of the device.

As illustrated, the rack is made of a piece of round metal wire bent into a series of sinuations in a single plane. The first pair of sinuations form the two side portions 1 and 2 of a U, which are straight and parallel, with the base portion 3 of the U at right angles to them and joining them in sharp curves. The first side portion 1 terminates slightly short of the second side portion 2, which latter portion has the straight junction 4 with the next pair of sinuations extending a considerable distance from its free end substantially at right angles to the two portions 1 and 2. The next pair of sinuations 5 and 6, with their junction, form the major part of a circle, and the wire is bent into a circular loop 7 at the middle of their junction. The first sinuation 5 of this pair leads from the straight junction 4 in a curve 8 of ample radius, and the second sinuation 6 of this pair terminates in an outward curve 9 of like radius. Next to the junction curve 8 the junction 4 has a distension 10 made by indenting the wire.

By the formation just described, the two side portions 1 and 2 of the U constitute display members of the rack, and the junction 4 constitutes its pivot member. The second pair of sinuations 5 and 6 constitute the bottle embracing extension, for which the curves 8 and 9 form a flaring entrance permitting the extension to be sprung easily around the bottle neck A. The loop 7 forms a hanger portion by which the device may be hung up when not in use.

The order indicating means comprises a plurality of flat circular pieces of metal forming order indicating elements 11, resembling metal checks or coins. Each element 11 has near a portion of its periphery two openings 12 and 13. The opening 12 is round, but the other opening 13 preferably is a slot elongated along a line through both openings. Each element 11 has stamped or engraved, or otherwise suitably formed on it, a designation of an article, or product to be ordered. These elements are put onto the rack by entering the first display member 1 through their round openings 12 and sliding the elements singly around the base part 3 of the U onto the second display member 2, from which they may be slid onto the pivot member 4, the distension 10 of which prevents the elements from coming too near the bottle neck A. The elements 11 thus will slide readily from either one of the portions or members 2 and 4 to the other, and will hang therefrom out of indicating position, as seen at B and C in Fig. 2, or at B, C and D in Fig. 1.

To place any one of the elements 11 in indicating position, it is swung upward on the pivot member 4, and the free end of the first display member 1 is entered through the second opening 13, and the element then is slid back on the two display members 1 and 2. The openings 12 and 13 are so relatively disposed that the element stands up from these members 1 and 2 in its indicating position as at E and F in Figs. 1 and 2. The elongation of the second opening 13 makes it readily receive the end of the first display member 1 as the element swings around the curve from the pivot member 4 onto the second display member 2, at its round opening 12. In selecting any intermediate element 11 of the series, those lying toward the display portion of the rack therefrom, and not desired to be displayed, are slid onto the second display member 2 and allowed to hang thereon, as at C in Fig. 2 or at C and D in Fig. 1. To change the selection of any elements 11 that are on the display portion of the rack, they must be slid onto the pivot member 4.

It will be understood that the pivot member 4 is not essentially distinct in direction from the display members 1 and 2, but could be a mere continuation, in the same direction, of the second display member 2. The actual reason for having it at an angle to the display members 1 and 2 is that the rack is more compact in this form. The essential operation requirement is that the first display member 2 must not extend along it to interfere with the swinging of the elements 11 on it, into position for receiving said display member 2 in the opening 13. Also, this opening 13 is not essentially an elongated slot. It may be round but larger than pivot opening 12, or it could be of the same size, which would however require greater care in locating the element 11 to receive the first display member 1 in this opening.

The display element 14 is a flat piece of metal, preferably of a non-circular ornamental contour, having two openings 15 and 16 near one edge, midway between which openings the edge has a tongue or lug 17. This display element has stamped, engraved or otherwise suitably formed on it, any desired display matter, which, according to my preferred method of distributing the devices, is the name of the purveyor of the merchandise ordered by the device.

This display matter thus differs for each lot of devices supplied to a respective purveyor or dealer. As all of the other parts of the device are, or may be, alike in all, or many, of the lots supplied to different dealers, it is desirable to keep the devices in stock completely assembled except for these display elements. Then when an order for a lot of the devices is received from a certain dealer, this dealer's name is placed upon a corresponding number of the display elements, which also may be kept in stock ready for this operation. Then the display element with the special matter thereon is assembled with the otherwise complete device by inverting it, with its tongue or lug 17 forward, and entering the first display member 1 through the opening 15 thereof, which will result in the other opening 16 being out from the display portion of the device, as seen in Fig. 4. The element 14 then is slid past the base portion 3, which reverses it, and along the other display member 2, as seen in Fig. 5, until, upon reaching the front end of this member 2, it is swung down as seen in Fig. 6. It then may have the first display member 1 entered through its other opening 16 and is slid back on both display members 1 and 2 until it abuts the base portion 3 with the tongue or lug 17 projecting back over this portion 3. This tongue or lug 17 then is bent down around the base portion 3, fixing the element 14 in position.

Preferably the dealer's name is on what will be the front surface of the element in its final fixed position, as indicated in Fig. 4. This display may include such advertising or other matter as may be desired. Also, the name of the manufacturer or dealer in the devices may be placed on the opposite or rear side of the element as indicated in Figs. 2, 5 and 6.

This display element 14 also serves as a stop element for the order indicating elements 11, which are made to slip easily around the curve from the pivot member 4 to the second display member 2, and thus in the absence of the display element 14 might almost as easily slip around the curves at the base portion 3 and entirely off the rack at the end of the first display member 1, in the manner in which they are assembled on the rack.

The order indicating elements 11 may be assembled on the rack in a different way, however. The rack may be partly formed, leaving the two display members 1 and 2 and their junction or base of the U in a straight line with the junction or pivot member 4. Then all of the order indicating elements are placed, all at once, in a group, on this straight unfinished portion of the rack and held close to the bottle embracing portion, after which the bends may be made to form the portions 1, 2 and 3 in their finished positions.

With the above method of manufacture the bends at the base portion 3 may be so shaped that the elements 11 will not pass onto this portion 3. In any case, the wire may be indented in the second display portion 2 as shown in Fig. 8, forming a distension 14a similar to the one at 10. Such provisions would permit the element 14 to be omitted, although it is preferred as a display element, with its more incidental function of stopping the order indicating elements 11.

It will be understood that not all the indicating elements essentially bear different designations. For instance two or more may bear the indication "1 pint milk" and as many of these as the number of pints desired may be set up into indicating position. As preferred, however, certain elements indicate commodities, as at G, and others indicate amounts more than one, to be set up with the commodity indicating element if more than one unit is wanted, as at H in Fig. 7.

It will be seen that the device may readily be modified for permanently hanging it up at an entrance, as a rack for the bottle, as at 7a in Fig. 9. However, I prefer to have the device portable with the bottle, and used in this way it is made of relatively light moderately springy wire. It will not readily detach from the bottle unless purposely pulled off, and the setting of the indicating elements will not be disturbed by upsetting the bottle, or in washing the bottle. The bottle may be used at table or in the refrigerator, and washed when empty, without detaching the device from the bottle. The entire device preferably is of rust resisting steel, and remains sanitary under all conditions of use.

Used in the above manner, the series of indicating elements serve as a constant reminder of the range of products available from the dealer's deliveryman. It therefore serves the dealer as a sales and advertising device, and the household as a convenience in deciding upon each day's requirements.

Modifications may occur other than those disclosed herein, and while I have rather specifically illustrated and described a preferred embodiment of my invention, I do not wish to be understood as being limited to such precise disclosure, but what I claim as new and desire to secure by Letters Patent is:

1. An order indicating device comprising a rack having a pivot member and a plurality of display members, and an order indicating element having means whereby it is adapted to hang on the pivot member or on one of the display members, said one display member being so related to said pivot member that said element may be slid from one member to another, and said element having means to engage the other display member when on the one display member, for holding the element in a definite display position, and said other display member being spaced from the other two members to permit said means of said element to engage it as specified as said element is slid from the pivot member onto the one display member.

2. An order indicating device comprising a rack having a pivot member and a plurality of substantially parallel display members, an order indicating element having openings, one receiving the pivot member or one of the display members, whereby it hangs on the pivot member or on said one of the display members, said one display member being so related to said pivot member that said element may be slid from one member to another, and said element having a second opening to receive the other display member when on the one display member, for holding the element in a definite display position, and said other display member being spaced from the other two members to permit said second opening to receive said member to engage it as specified as said element is slid from the pivot member onto the one display member.

3. A device as set forth in claim 1, including a display element fixed to portions of the display members remote from the pivot member, acting as a stop for the order indicating element.

4. A device as set forth in claim 1, including a bottle engaging member, whereby said device may be supported on a bottle.

5. A device as set forth in claim 1, including a member to retentively extend around a bottle neck, whereby said device may be supported on a bottle.

6. A device as set forth in claim 1, including a member to retentively extend around a bottle neck whereby said device may be supported on a bottle, and including a hanger portion by means of which the device may be hung on a suitable support.

7. A device as set forth in claim 1 in which the pivot member is at a substantial angle to each display member.

8. A device as set forth in claim 1 in which the display members are substantially parallel to each other and at a substantial angle to the pivot member.

9. A device as set forth in claim 2 in which the pivot member and the one display member and the one opening in the element are substantially circular, and in which the other opening in said element is elongated to easily receive the second display member.

10. A device as set forth in claim 2 in which the substantially parallel display members are at a substantial angle to the pivot member.

11. An order indicating device comprising a wire bent to form a U with a portion extending from the free end of one side portion of the U, and an order indicating element having means whereby it hangs on said extending portion or on the adjacent side portion of the U and may be slid from either portion to the other, and said element having means to engage the other side portion when on the one side portion, to hold the element in definite display position.

12. A device as set forth in claim 11, including a display element fixed to the U near its base portion, acting as a stop for the order element.

13. An order indicating device comprising a wire bent to form a U with a portion extending from the free end of one side portion of the U, and an order indicating element having two openings, one receiving the extending portion or the adjacent side portion of the U and allowing the element to slide from either portion to the other, and the other opening receiving the other side portion of the U.

14. A device as set forth in claim 11, including a stop element for the order indicating element having a portion bent around the base of the U.

15. A device as set forth in claim 11, including a stop element for the order indicating element having a portion embracing the sides of the U and a portion bent around the base of the U.

16. An order indicating device comprising a wire bent to form sinuations, one pair forming display members and a second pair forming a bottle embracing member, the two pairs of sinuations having a junction of substantial extent, forming a pivot member, and an order indicating element having means whereby it hangs on said pivot member or on the adjacent display member or may slide from either member to the other, said element having means to engage the other display member when on the said adjacent display member, to hold the element in definite display position.

17. A device as set forth in claim 16 in which the junction portion has a distension near the second pair of sinuations to retain the order element away from the bottle.

18. An order indicating device comprising a rack having a bottle embracing extension, a pivot part and a display part, and order indicating means movable from either one of said parts to the other, the display part and the indicating means having spaced mutually engaging portions preventing swinging of the indicating means out of display position, whereby said display part supports the indicating means away from and independently of any engagement of the indicating means with the bottle.

19. A device as set forth in claim 18, in which the engaging portions of the display part are distinct elements with both of which the order indicating means engages both of its engaging portions to be held in display position, or with only one of which said order indicating means engages only one of its engaging portions so as to hang on the element out of display position.

20. A device as set forth in claim 18, in which the engaging portions of the display part are distinct elements with both of which the order indicating means engages both of its engaging portions to be held in display position, or with only one of which said order indicating means engages only one of its engaging portions so as to hang on the element out of display position, and in which device there is included at least one additional order indicating means operatively related to the pivot part and the display part in like manner as the aforementioned order indicating means, the plurality of order indicating means being selectively movable from one part to the other and into and out of display position on the display part.

HARRY D. HOOGE.